United States Patent
Greenwood et al.

(10) Patent No.: US 7,415,181 B2
(45) Date of Patent: Aug. 19, 2008

(54) FIBER OPTIC CABLES AND ASSEMBLIES FOR FIBER TO THE SUBSCRIBER APPLICATIONS

(75) Inventors: Jody L. Greenwood, Hickory, NC (US); David L. Dean, Jr., Hickory, NC (US); Kenneth D. Temple, Jr., Newton, NC (US); Keith H. Lail, Connelly Springs, NC (US)

(73) Assignee: Corning Cable Systems LLC, Hickory, NC (US)

(*) Notice: Subject to any disclaimer, the term of this patent is extended or adjusted under 35 U.S.C. 154(b) by 218 days.

(21) Appl. No.: 11/193,516

(22) Filed: Jul. 29, 2005

(65) Prior Publication Data
US 2007/0025668 A1 Feb. 1, 2007

(51) Int. Cl.
*G02B 6/44* (2006.01)

(52) U.S. Cl. .......... 385/100; 385/102; 385/103; 385/107; 385/113

(58) Field of Classification Search .......... 385/100
See application file for complete search history.

(56) References Cited

U.S. PATENT DOCUMENTS

| | | | | |
|---|---|---|---|---|
| 4,078,853 A | 3/1978 | Kempf et al. | ........... | 350/96.23 |
| 4,089,585 A | 5/1978 | Slaughter et al. | ........ | 350/96.23 |
| 4,199,225 A | 4/1980 | Slaughter et al. | ........ | 350/96.23 |
| 4,401,361 A | 8/1983 | Slaughter | ................. | 350/96.23 |
| 4,420,220 A | 12/1983 | Dean et al. | ............... | 350/96.23 |
| 4,446,686 A | 5/1984 | Panuska et al. | ................... | 57/6 |
| 4,761,053 A | 8/1988 | Cogelia et al. | .......... | 350/96.23 |
| 4,979,795 A | 12/1990 | Mascarenhas | ........... | 350/96.23 |
| 5,125,060 A | 6/1992 | Edmundson | ............... | 385/100 |
| 5,125,063 A | 6/1992 | Panuska et al. | ............ | 385/113 |
| 5,218,659 A | 6/1993 | Schneider | .................. | 385/110 |
| 5,630,003 A | 5/1997 | Arroyo | ....................... | 385/113 |
| 5,651,081 A | 7/1997 | Blew et al. | ................. | 385/101 |
| 5,668,912 A * | 9/1997 | Keller | ........................ | 385/100 |
| 5,673,352 A | 9/1997 | Bauer et al. | ................. | 385/114 |
| 5,675,686 A * | 10/1997 | Rosenmayer et al. | ....... | 385/114 |
| 6,314,224 B1 | 11/2001 | Stevens et al. | ............. | 385/113 |
| 6,321,012 B1 | 11/2001 | Shen | .......................... | 385/106 |

(Continued)

FOREIGN PATENT DOCUMENTS

DE 2434280 7/1974

(Continued)

*Primary Examiner*—Frank G Font
*Assistant Examiner*—Mary A El Shammaa
(74) *Attorney, Agent, or Firm*—C. Keith Montgomery (57) ABSTRACT

A fiber optic cable has at least one optical fiber, at least one strength member having a major strength member dimension, and a cable jacket. The cable jacket has two major surfaces that are generally flat and includes a cavity with a cavity minor dimension generally orientated with a minor dimension of the fiber optic cable, wherein the at least one optical fiber is disposed within the cavity. In one embodiment, the cavity minor dimension of the fiber optic cable is about the same size or larger than the strength member dimension that is generally aligned with a minor dimension of the cable, thereby allowing access to the cavity when the fiber optic cable is entered while inhibiting damage to the at least one optical fiber. Fiber optic cables of the present invention are also suitable as a portion of a cable assembly.

30 Claims, 8 Drawing Sheets

U.S. PATENT DOCUMENTS

| | | | |
|---|---|---|---|
| 6,463,199 B1 | 10/2002 | Quinn et al. | 385/109 |
| 6,493,491 B1 | 12/2002 | Shen et al. | 385/113 |
| 6,579,014 B2 | 6/2003 | Melton et al. | 385/76 |
| 6,618,526 B2 | 9/2003 | Jackman et al. | 385/102 |
| 6,654,527 B2 | 11/2003 | Sakabe et al. | 385/114 |
| 6,714,708 B2 | 3/2004 | McAlpine et al. | 385/110 |
| 6,728,451 B2 | 4/2004 | Kordahi | 385/100 |
| 6,748,148 B2 | 6/2004 | Chiasson et al. | 385/114 |
| 6,749,446 B2 | 6/2004 | Nechitailo | 439/114 |
| 6,792,184 B2 | 9/2004 | Conrad et al. | 385/114 |
| 6,847,768 B2 | 1/2005 | Lail et al. | 385/111 |
| 6,853,783 B2 | 2/2005 | Chiasson et al. | 385/114 |
| 2004/0120663 A1* | 6/2004 | Lail et al. | 385/100 |
| 2004/0156603 A1 | 8/2004 | Schneider et al. | 385/102 |
| 2005/0053342 A1 | 3/2005 | Melton et al. | |
| 2006/0140557 A1* | 6/2006 | Parris et al. | 385/113 |
| 2006/0165355 A1 | 7/2006 | Greenwood et al. | 385/100 |

FOREIGN PATENT DOCUMENTS

| | | |
|---|---|---|
| EP | 1087247 | 4/2000 |
| JP | 60-087307 | 5/1985 |
| JP | 63-201611 | 8/1988 |

* cited by examiner

FIBER OPTIC CABLES AND ASSEMBLIES FOR FIBER TO THE SUBSCRIBER APPLICATIONS

FIELD OF THE INVENTION

The present invention relates generally to fiber optic cables and assemblies that are useful for routing optical fibers toward the subscriber such as toward the home, the business and/or the curb. Specifically, the fiber optic cables and assemblies of the present invention are useful as feeder cables, distribution cables, drop cables, and/or other suitable cables/assemblies in an optical network.

BACKGROUND OF THE INVENTION

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data with a reasonable cable diameter. Consequently, optical waveguide cables replaced most of the copper cables in long-haul communication network links, thereby providing greater bandwidth capacity for long-haul links. However, most communication networks still use copper cables for distribution and/or drop links on the subscriber side of the central office. In other words, subscribers have a limited amount of available bandwidth due to the constraints of copper cables in the communication network. Stated another way, the copper cables are a bottleneck that inhibit the subscriber from utilizing the relatively high-bandwidth capacity of the optical fiber long-haul links.

As optical waveguides are deployed deeper into communication networks, subscribers will have access to increased bandwidth. But certain obstacles exist that make it challenging and/or expensive to route optical waveguides/optical cables closer to the subscriber. For instance, accessing optical waveguides and the connection between a drop cable and the distribution fiber optic cable require a low-cost solution that is craft-friendly for installation, connectorization, and versatility. Moreover, the reliability and robustness of the fiber optic cables and the interconnection therebetween must withstand the rigors of an outdoor environment.

Conventional distribution fiber optic cables require opening by cutting or otherwise splitting the cable jacket and pulling the optical fibers through the jacket opening. However, it can be difficult to locate the correct fibers, and even when they are located, removing them from the cable without damaging the selected optical fibers or other optical fibers in the cable can be challenging. Once the desired optical fibers are located and safely removed, the operator has to connectorize or splice the optical fibers for optical connection with the network. Conducting the access process with conventional cables in less-than-ideal conditions in the field is time-consuming, expensive, and risks damaging the optical fibers of conventional cables. Likewise, the access process is difficult in the factory with conventional cables.

SUMMARY OF THE INVENTION

To achieve these and other advantages and in accordance with the purpose of the invention as embodied and broadly described herein, the invention is directed in one aspect to a fiber optic cable that includes at least one optical fiber, at least one strength member and a cable jacket. The cable jacket has two major surfaces that are generally flat and a cavity, wherein the cavity has a cavity minor dimension generally orientated with a minor dimension of the fiber optic cable. The at least one optical fiber is disposed within the cavity and the cavity minor dimension is larger than a strength member dimension D that is defined as being generally aligned with the minor dimension of the fiber optic cable, thereby allowing quick and easy access to the cavity while inhibiting damage to the at least one optical fiber.

In another aspect the invention is directed to a cable assembly having at least one optical fiber, at least one strength member, a cable jacket, and a multifiber ferrule. The cable jacket has two major surfaces that are generally flat and a cavity, where the cavity includes a cavity minor dimension generally orientated with a minor dimension of the cable jacket. The multifiber ferrule is attached to the at least optical fiber and the multifiber ferrule has a cross-section with a minor dimension and a major dimension. The minor dimension of the multifiber ferrule is generally aligned with the minor dimension of the cable jacket.

In another aspect the invention is directed to a cable assembly having a distribution cable and a tether cable. The distribution cable includes at least one optical fiber, at least one strength member, and a cable jacket. The cable jacket of the distribution cable has two major surfaces that are generally flat and a cavity. The cavity has a cavity minor dimension generally orientated with a minor dimension of the cable jacket. The at least one optical fiber is disposed within the cavity and the cavity minor dimension is about the same size or larger than a strength member dimension D, thereby allowing access to the cavity when the fiber optic cable is entered while inhibiting damage to the at least one optical fiber. The tether optical fiber cable includes at least one tether optical fiber that is in optical communication with the at least one optical fiber of the distribution cable. The cable assemblies can further include ferrules and/or connectors for plug and play connectivity.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary and explanatory embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various exemplary embodiments of the invention, and together with the description, serve to explain the principles and operations of the invention.

DETAILED DESCRIPTION OF EXEMPLARY EMBODIMENTS

Reference will now be made in detail to exemplary embodiments of the invention, examples of which are described herein and shown in the accompanying drawings. Whenever practical, the same reference numerals are used throughout the drawings to refer to the same or similar parts or features.

Figures 1, 1A:
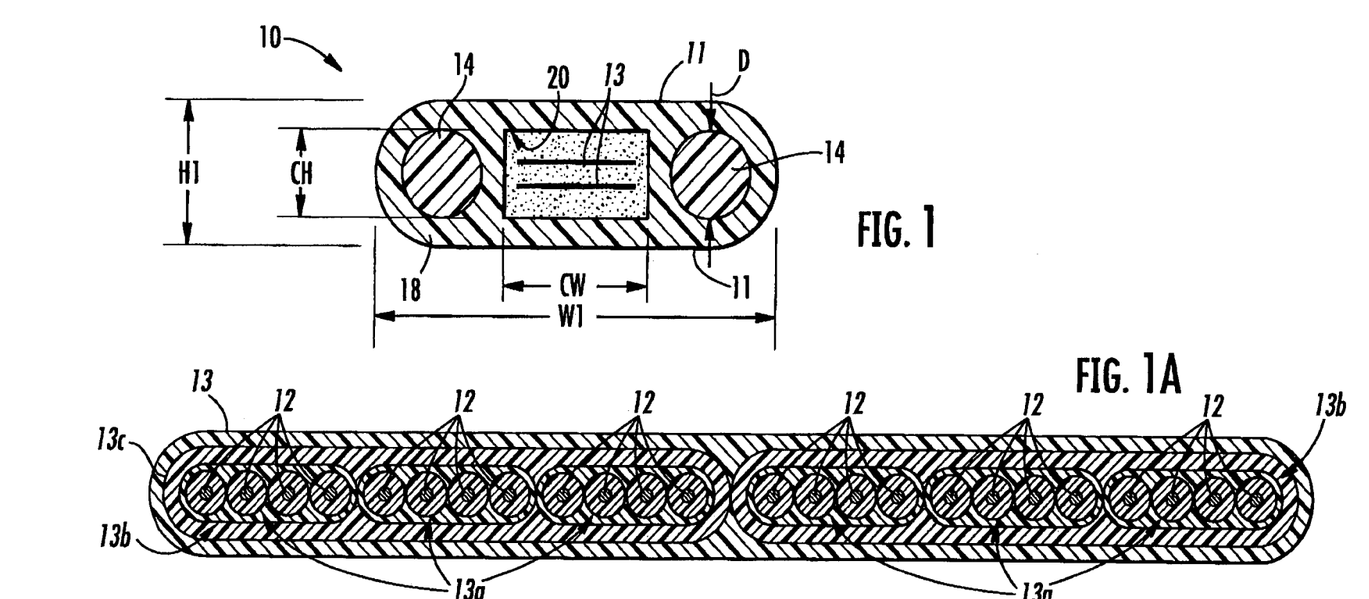
FIG. 1 is a cross-sectional view of an explanatory embodiment of a fiber optic cable according to the present invention.
FIGS. 1a-1c depict cross-sectional views of exemplary optical fiber ribbons suitable for use in the cables of the present invention.
Figure 1B:
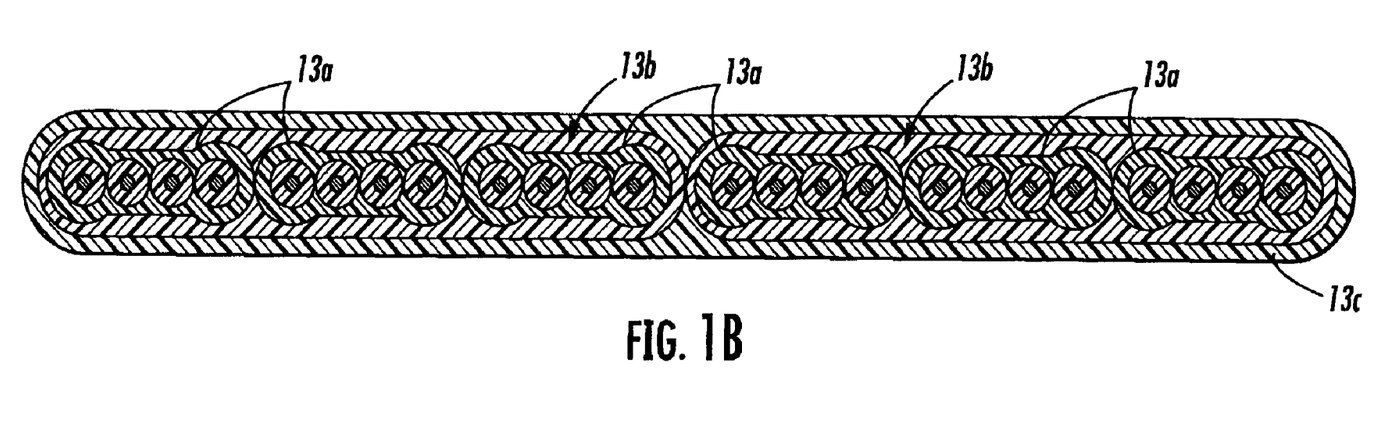
Figure 1C:
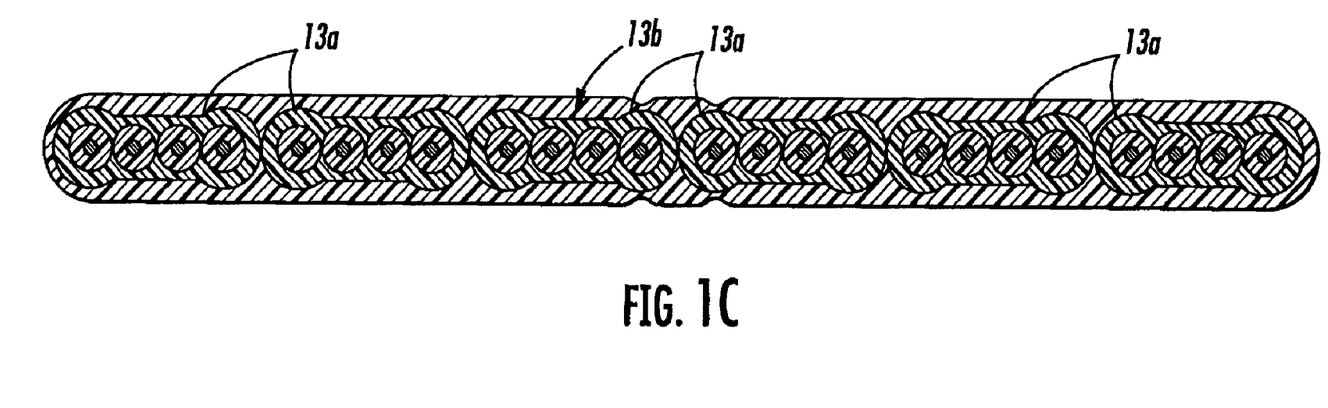

FIG. 1 depicts an exemplary fiber optic cable 10 (hereinafter cable 10) according to the present invention that can be configured for use as a drop cable, a distribution cable, or other suitable portions of an optical network. Generally speaking, a distribution cable will have a relatively high optical fiber count such twelve or more optical fibers for further distribution to the optical network. On the other hand, a drop cable will have a relatively low optical count such as up to four optical fibers for routing towards a subscriber or a business, but drop cables may include higher fiber counts. Cable 10 generally includes at least one optical fiber 12 disposed as a portion of an optical fiber ribbon 13, at least one strength member 14, and a cable jacket 18 having a cavity 20 configured with a generally flat profile. In other words, cables of the present invention have two major surfaces 11 that are generally flat and are connected by arcuate end surfaces (not numbered) as shown, thereby resulting in a cable having a relatively small cross-sectional footprint. As best shown in FIGS. 1a-1c, at least one optical fiber 12 is arrayed with a plurality of other optical fibers as a portion of optical fiber ribbon 13. Cable 10 also includes two strength members 14 disposed on opposing sides of cavity 20, thereby imparting a preferential bend characteristic to cable 10. Strength members 14 are preferably a dielectric material such as glass-reinforced plastic, thereby allowing an all dielectric cable design; however, strength members may be a conductive material such as steel or the like. Cavity 20 is sized for allowing ribbons 13 the adequate freedom to move when, for instance, the cable is bent while maintaining adequate optical attenuation performance of the optical fibers within the cable. Simply stated, the cavity is not tightly drawn onto the optical fiber, but allows some movement. Additionally, jacket 18 may be formed from a flame-retardant material, thereby making it suitable for indoor applications such as multi-dwelling units (MDUs).

Cable 10 is advantageous because it can be easily accessed from either of the generally planar sides of the cable, thereby allowing access to the desired optical fiber. In other words, ribbons from either side of the ribbon stack, i.e., top or bottom, can be accessed by opening the cable at the respective planar side. Consequently, the craftsman is able to access to any optical fiber desired for optical connection. As depicted, cavity 20 has a cavity minor dimension CH and a cavity major dimension CW and has a generally rectangular shape with a fixed orientation, but other shapes and arrangements are possible such as generally square, round, or oval. By way of example, cavity may be rotated or stranded in any suitable manner along its longitudinal length. The cavity can also have a partial oscillation through a given angle, for instance, the cavity can rotate between a clockwise angle that is less than a full rotation and then rotate counter-clockwise for less than a full rotation. Furthermore, one or more cavities may be offset towards one of the major surfaces 11, thereby allowing easy opening and access from one side as shown in FIG. 7a.

As shown in FIG. 1, cavity minor dimension CH is generally aligned with a minor dimension H1 of distribution cable 10 and cavity major dimension CW is generally aligned with the major dimension W1 of cable 10. As depicted, strength members 14 are disposed on opposite sides of cavity 20 and are sized so that a strength member dimension D generally aligned with minor dimension H1 of the cable is about the same size or smaller than the cavity minor dimension CH. By way of example, cavity minor dimension CH is sized so it is about five percent larger or more than a strength member dimension D that is generally aligned with minor dimension H1 of the cable. Illustratively, strength member 14 is a round glass-reinforced plastic (grp) having a diameter of about 2.3 millimeters and cavity minor dimension CH is about 2.5 millimeters. Of course, strength members 14 can have shapes other than round such as the oval strength members shown in FIG. 2.

Consequently, the craftsman or automation process has simple and easy access to cavity 20 by running a utility blade or cutting tool along the length of the cable without cutting into strength members 14, thereby allowing entry to cavity 20 while inhibiting damage to the at least one optical fiber 12 or strength members during the access procedure. In other words, the craftsman can simply cut into cable jacket 18 by slicing the cable jacket 18 and may use strength members 14 as a guide for the blade or cutting tool, thereby exposing cavity 20 during the cutting and allowing access to the at least one optical fiber therein. In other words, sizing the cavity minor dimension CH so that it is about the same size or greater than the strength member dimension D that is generally aligned with minor dimension H1 advantageously allows quick and reliable access to cavity 20. Thus, the optical fibers in the cables of the present invention may be easily, quickly, and repeatably accessed by a craftsman or likewise in an automated process. However, cable or cable assembly embodiments according to the present invention can have cavities with minor cavity dimensions generally aligned with the minor cable dimension that are smaller than the strength member dimension D. Additionally, the generally flat major surfaces of the cables are advantageous because they allow for a smaller cable footprint and uses less jacket material compared with round cables.

Figure 5:
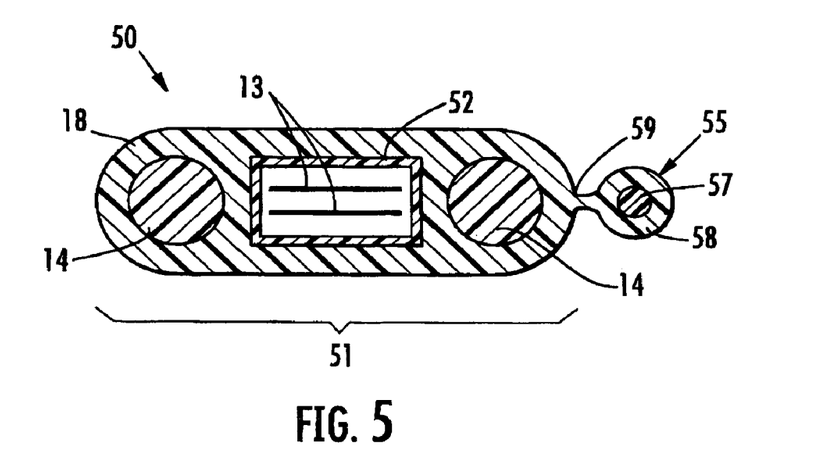
FIG. 5 is a cross-sectional view of another explanatory fiber optic cable according to the present invention.
Figures 12A, 13:
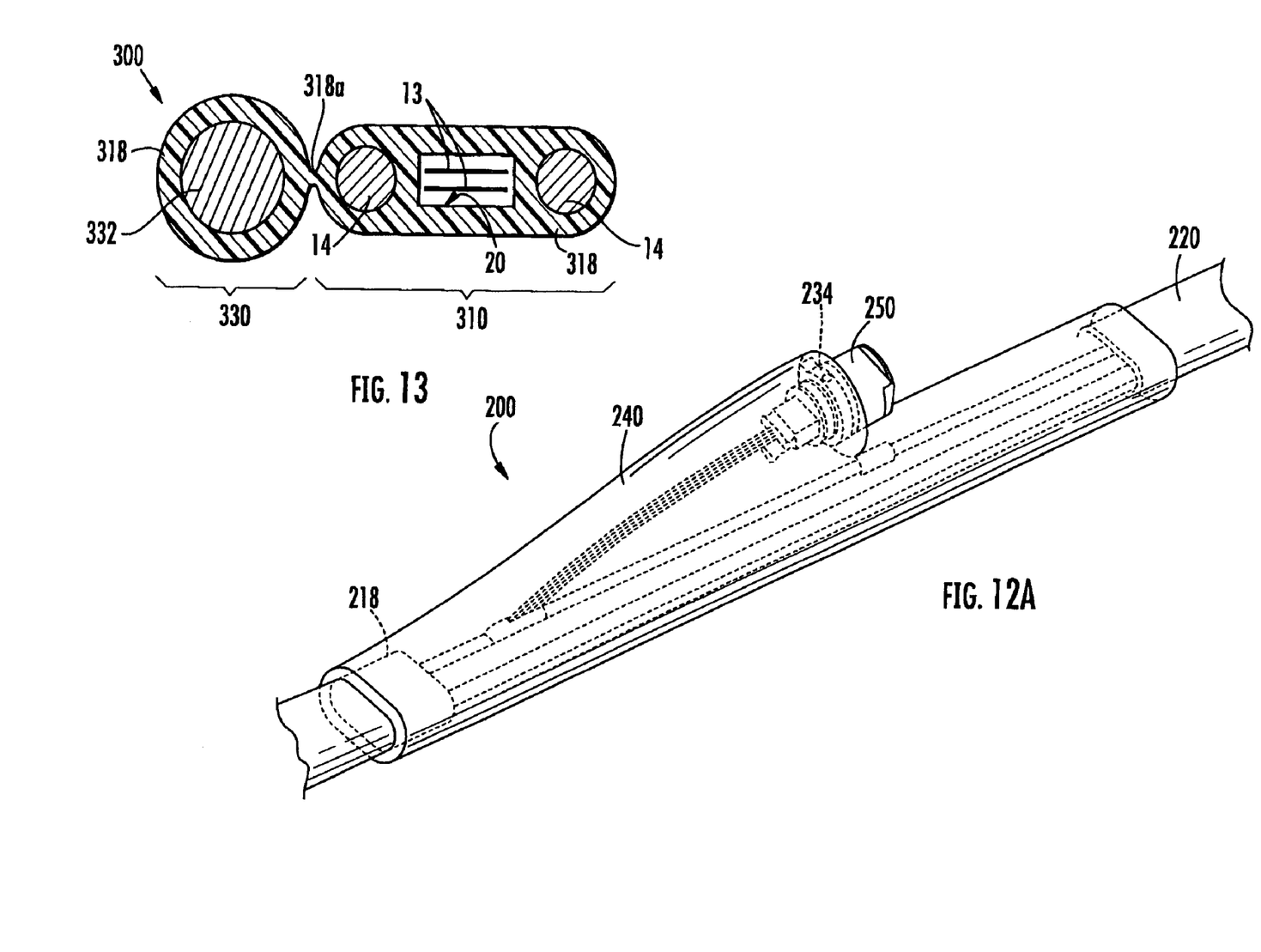
FIG. 13 is a cross-sectional view of yet another fiber optic cable according to the present invention.

Cables according to the present invention may have any suitable dimensions, constructions, and/or fiber counts for the given application. By way of example, in distribution applications the major dimension W1 is preferably about 15 millimeters or less and the minor dimension H1 is preferably about 10 millimeters or less. In drop applications, major dimension W1 is preferably about 10 millimeters or less and the minor dimension H1 is preferably about 5 millimeters or less. Of course, other cables of the present invention can have other sizes and/or structures for the given application depending on the requirements and fiber count of the cable. For instance, cables of the present invention may have larger dimensions for the major dimension, the-minor dimension, and/or different structures such as a toneable portion as shown in FIG. 5 for locating the cable in buried applications. FIG. 13 depicts a cable 300 suitable for aerial applications that is similar to cable 10 but it further includes a messenger section 330 having a messenger strength member 332. Messenger strength member 332 is connected with a main cable body 310 by a web 318a of cable jacket 318. Messenger strength member 332 may be formed form any suitable material such as a dielectric or conductor and/or have any suitable construction such as solid rod or stranded. Additionally, cable designs can have any suitable fiber count and/or optical fiber arrangement depending on the application in the optical network. Some suitable optical fiber arrangements include ribbons with or without subunits, ruggedized ribbons having a tight-buffer layer, tight-buffered or colored optical fibers, loose optical fibers in a tube, optical fibers in a module, or optical fibers disposed in a bundle.

Optical fiber ribbons 13 used in the cables of the present invention can have any suitable design or ribbon count. FIGS. 1a-1c depict exemplary optical fiber ribbons 13 that use a plurality of subunits each having four optical fibers; however, ribbons without subunits are possible and subunits may have different fiber counts. Subunits allow predetermined splitting of the optical fiber ribbons into predictable smaller fiber count units, preferably without the use of special tools. Specifically, each of the depicted ribbons includes six subunits for a total of twenty-four optical fibers 12, thereby making the illustrated ribbon configurations advantageous for a distribution cable. FIG. 1a depicts a twenty-four fiber ribbon 13 with two twelve-fiber units (not numbered) each having three subunits 13a connected by secondary matrix 13b and the twelve-fiber units are connected together by a common matrix 13c. FIG. 1b depicts another similar twenty-four fiber ribbon 13, except subunits 13a have end portions with a bulbous shape that is at least partially disposed over the outboard optical fibers of subunits 13a as disclosed in U.S. Pat. Nos. 6,748,148 and 6,792,184, the disclosures of which are incorporated herein by reference. FIG. 1c depicts a twenty-four fiber ribbon that merely uses subunits 13a and secondary matrix 13b for connecting the subunits together, but secondary matrix further includes preferential tear portions (not numbered) for separating the ribbon into two twelve-fiber units. Of course, other suitable ribbon configurations are possible such as two twelve fiber units, three eight fiber units, or six four fiber units depending on the requirements of the network architecture.

Optical fibers preferably have an excess fiber length (EFL) compared with a length of cavity 20. For instance, optical fibers have an EFL of between about 0.0 and about 0.5 percent; however, in some instances the EFL may also be slightly negative. Likewise, ribbons can have an excess ribbon length (ERL). Besides inhibiting the application of strain to the optical fibers, EFL or ERL can aid in coupling the optical fibers or ribbons with the cable jacket or tube. By way of example, the ERL is preferably in the range of about 0.1 percent to about 0.5 percent, thereby inhibiting the application of strain, allowing bending of the fiber optic cable without causing elevated levels of optical attenuation, and/or suitable low temperature performance.

Figure 2:
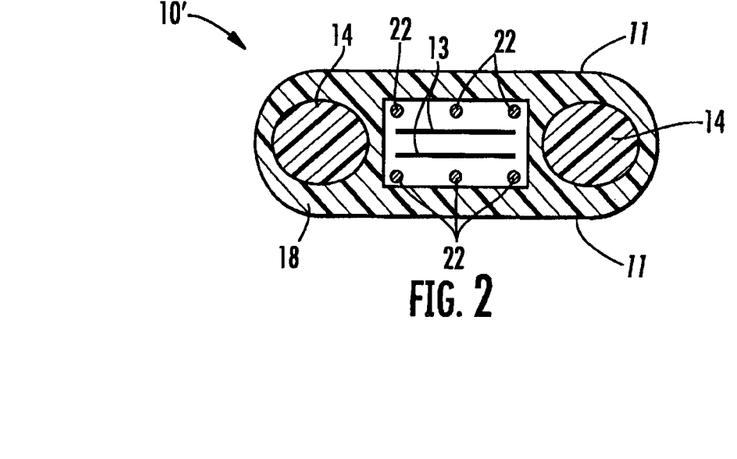
FIG. 2 is a cross-sectional view of another explanatory fiber optic cable according to the present invention.

As shown in FIG. 1, cavity 20 may be filled with a thixotropic grease or gel (not numbered) to inhibit the migration of water along the same. However, other suitable structures for inhibiting the migration of water along the cable are possible. As shown in FIG. 2, cable 10' is similar to cable 10 but further includes at least one water-swellable yarn 22 or thread disposed longitudinally within cavity 20 for blocking the migration of water. Water blocking structures may also be intermittent along the cable. For instance, the grease or gel may be disposed intermittently within the cavity or tube. Likewise, intermittent plugs of silicone, foam, or other suitable materials may be used to block the migration of water along the cable.

Figure 3:
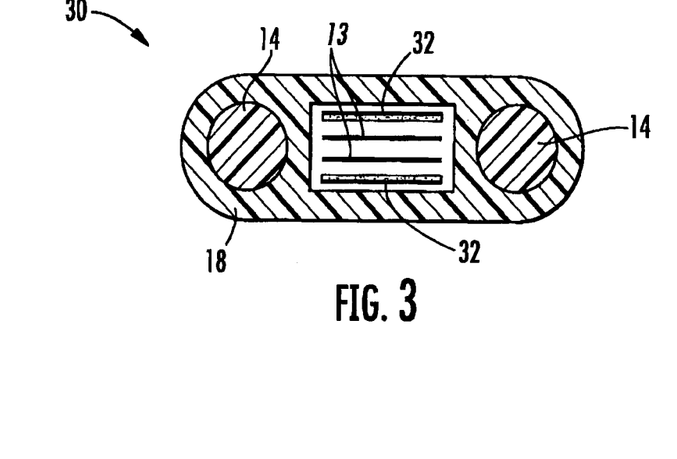
FIG. 3 is a cross-sectional view of still another explanatory fiber optic cable according to the present invention.

FIG. 3 depicts a cable 30 that is similar to cable 10 but further includes a plurality of foam tapes 32 disposed within the cavity 20 for coupling the ribbons with jacket 18, but foam tape 32 can also serve for blocking the migration of water along the cable. As depicted, foam tapes 32 are disposed on both the top and bottom of the ribbon stack, but one or more foam tapes may be wrapped about the optical fibers or disposed on one or more sides thereof. Specifically, cable 30 has two foam tapes 32 formed from an open cell polyurethane material; however, other suitable materials for coupling are possible. In one embodiment, one or more foam tapes 32 include a water-swellable layer for inhibiting the migration of water within the cable. For instance, a foam layer and a water-swellable layer are laminated together, thereby forming the water-swellable foam tape. Generally speaking, water-swellable yarns and/or foam tapes are multi-functional. For instance, besides aiding the coupling the optical fibers, ribbons, or modules with the cable jacket, they may inhibit the migration of water, as well as cushion the optical fibers during bending of the cable.

Figure 4:
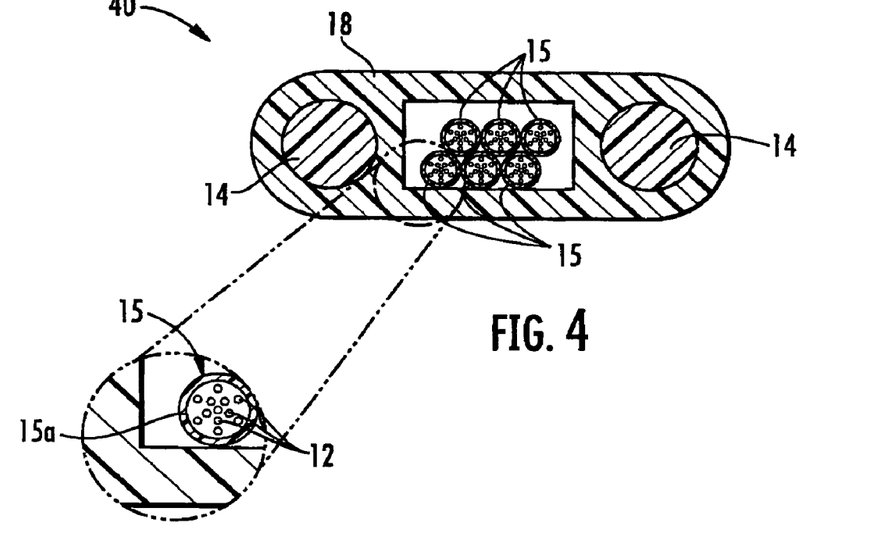
FIG. 4 is a cross-sectional view of yet another explanatory fiber optic cable according to the present invention.

FIG. 4 depicts a cable 40 similar to cable 10 that has a plurality of optical fiber modules 15 instead of ribbons 13. Optical fiber modules 15 organize and protect the plurality of optical fibers 12 within each module jacket 15a. Consequently, optical fiber modules 15 can be routed out of the cavity of cable 40 while still having a protective covering disposed about the optical fibers. By way of example, each optical fiber module 15 includes twelve colored optical fibers 12, thereby forming a relatively high optical fiber packing density. Moreover, optical fiber modules 15 allows access to individual optical fibers within the module jacket 15a without having to remove the same from a ribbon matrix material. Preferably, module jacket 15a is formed from a material that is easily tearable without tools. For instance, module jacket 15a is formed from a highly filled material so that it is easily tearable by the craftsman merely using his fingers to tear the same and it will not stick to colored or tight-buffered optical fibers. Suitable module jacket materials may include a polybutylene terephthalate (PBT), a polycarbonate and/or a polyethylene (PE) material having a talc and/or an ethylene vinyl acrylate (EVA); however, other suitable materials are possible such as a UV-curable acrylate. Modules 15 may include other suitable components such as a grease, water-swellable yarn, suitable thread or tape, a ripcord, or other suitable component. Additionally, the cavity of cable 40 may include a grease, water-swellable yarn or tape, and/or any other suitable component.

FIG. 5 depicts a fiber optic cable 50 that is similar to cable 10, but it further includes a tube 52 within the cavity and a toneable lobe 55. Tube 52 provides further protection for optical fibers 12 when opening the cavity. Moreover, since optical fibers 12 remain within a protective structure after the cavity of the cable is opened, i.e., tube 52, module or the like, the optical fibers may be routed and stored while still being protected. By way of example, when the cable is routed into a closure a portion of jacket 18 is removed and strength members 14 are cut to an appropriate length so they can be strain relieved, thereafter tube 52 having optical fibers 12 therein can be routed within the closure while being protected and the protective structure can be removed or opened when required. In this embodiment, tube 52 provides the freespace that allows fiber movement. Additionally, the material for tube 52 may be selected for providing predetermined friction properties for tailoring the coupling level between the optical fibers, ribbons, modules, or the like.

Cable 50 also includes toneable lobe 55 that is useful for locating the cable in buried applications while still allowing for a main cable body 51 that is dielectric. Toneable lobe 55 includes a conductive wire 57 disposed within a jacket portion 58 of toneable lobe 55. By way of example, conductive wire 57 is a 24-gauge copper wire that allows the craftsman to apply a toning signal thereto for locating the cable so it can be located or have its location marked to prevent inadvertent damage. Jacket 18 and jacket portion 58 are typically co-extruded simultaneously using the same extrusion tooling. As shown, jacket portion 58 is connected with jacket 18 of main cable body 51 by a frangible web 59 so that toneable lobe 55 can easily be separated from main cable body 51 for connectorization or other purposes. Specifically, web 59 can include a preferential tear portion (not numbered) using suitable geometry for controlling the location of the tear between the toneable lobe 55 and main cable body 51. Toneable lobe 55 preferably tears away from main cable body 51 cleanly so that it does not leave a ridge thereon, thereby allowing for a profile that permits easy sealing with a connector boot or the like. Toneable lobe 55 is advantageous because if the cable is struck by lightning the toneable lobe 55 would be damaged, but main cable body 51 would not be significantly damaged since it is dielectric. Consequently, the cable is toneable without requiring the labor and hardware necessary for grounding the cable. Of course, other cables of the present invention may also include a toneable lobe.

Figure 6:
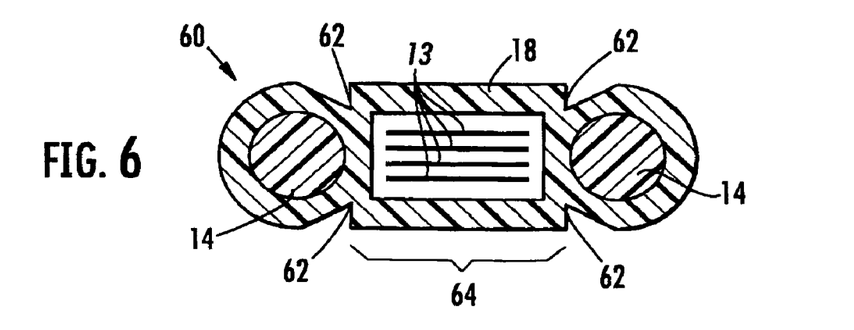
FIG. 6 is a cross-sectional view of an explanatory fiber optic cable having a tearable portion for separating a portion of the cable according to the present invention.

FIG. 6 depicts another cable 60 similar to cable 10 which further includes at least one preferential tear portion 62 for separating one or more of the strength members 14 from a medial portion 64 of cable 60. As depicted, cable 60 includes four preferential tear portions 62 disposed between a respective strength member 14 and medial portion 64. Consequently, each respective strength member 14 along with a portion of jacket 18 may be separated from medial portion 64 of cable 60 by the application of a sufficient separation force. Preferential tear portions 62 are advantageous because they allow optical fibers 12 to have a protective structure without using a module or tube. In other words, the portion of jacket 18 that remains after separating strength members 14 from medial portion 64 acts as a protective structure for the optical fibers. Additionally, cable 60 includes more than two optical fiber ribbons 13, thereby yielding a relatively high fiber count for distribution.

Figure 7:
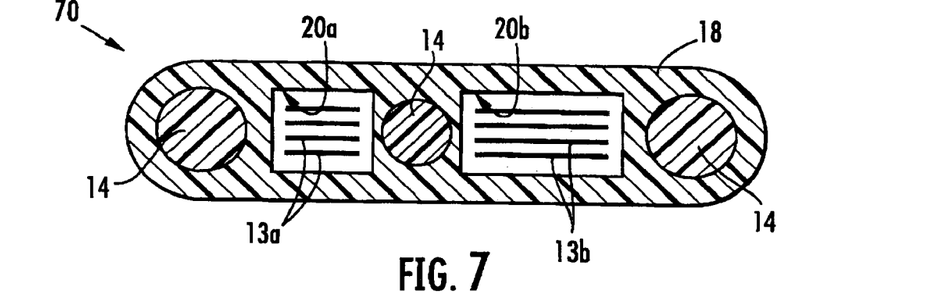
FIG. 7 is a cross-sectional view of an explanatory fiber optic cable having a plurality of cavities according to the present invention.
Figure 7A:
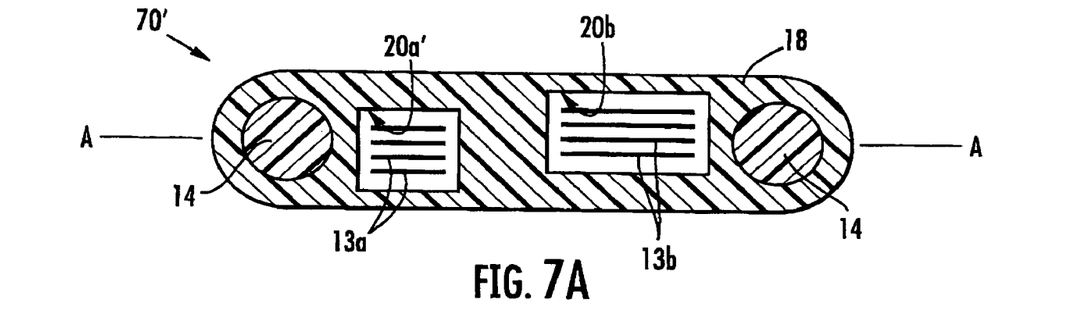

FIG. 7 depicts still another cable 70 according to the present invention that includes a plurality of cavities 20a, 20b for housing optical fibers. Using more than one cavity allows for flexibility in the cable applications. Multiple cavities can have similar or different sizes that are suited for the particular application. As shown, cavities 20a, 20b have similar minor dimensions, but have different major dimensions, thereby allowing different ribbon fiber counts in respective cavities. Specifically, cavity 20a is sized for a plurality of 4-fiber ribbons 13a that can be accessed for distribution along the cable and then routed toward the subscriber and cavity 20b is sized for a plurality of 12-fiber ribbons 13b that are intended to run the entire length of the cable. Other embodiments are possible, for instance, a first cavity can have modules with 4-fibers and a second cavity can have modules with 12-fibers. FIG. 7 also illustrates an optional strength member 14 disposed between cavities 20a and 20b. The optional strength member is advantageous if it desired to only access one of the cavities when opening the cable by allowing a stopping point and/or a guide for the cutting tool. The optional strength member may be the same size as the outboard strength members or it may have a different size. Moreover, the optional strength member may have a shape other than round so that the major cable dimension may be minimized. Other structures may be used for aiding in opening only one of multiple cavities. For instance, FIG. 7a depicts a cable 70' having cavities 20a' and 20b' that are offset relative to plane A-A that passes through the center points of strength members 14. Specifically, cavity 20a' is offset towards the bottom major surface of the cable for access from that surface and cavity 20b' is offset towards the top major surface of the cable for access from that surface. Simply stated, the cavity having the four fiber ribbons is easily accessible from one major surface and the cavity having the twelve fiber ribbons is easily accessible from the other major surface. Moreover, one or more of the major surfaces may be marked (not visible) to indicate which cavity is accessible from the given surface. Of course, other cables configurations of the present invention can use more than one cavity.

Figure 8:
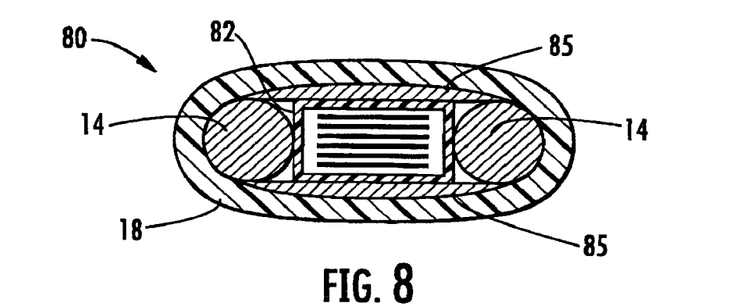
FIG. 8 is a cross-sectional view of an explanatory fiber optic cable having an armored component according to the present invention.
Figure 8A:
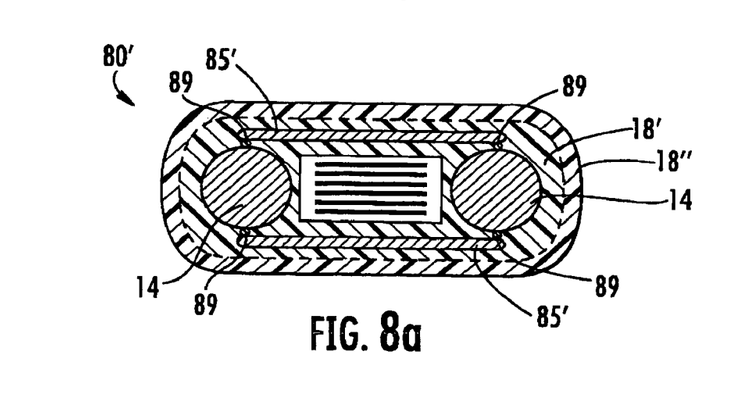

FIG. 8 illustrates a fiber optic cable 80 that includes at least one armored component 85 that provides rodent protection and/or additional crush strength for the cable. Specifically, cable 80 includes at least one optical fiber 12 disposed within a tube 82 that has strength members 14 disposed on opposite ends thereof, two armor components 85 are disposed about tube 82, and jacket 18 is applied thereover. Armor components 85 may be formed from any suitable material such as a dielectric such as a high-strength polymer or a conductive material such as a steel tape. Moreover, the armor components may be, shaped, ribbed, corrugated or the like for improving its crush strength and/or flexural performance of the cable. In this embodiment, armor components 85 have respective curved end portions that generally contact each strength member 14 so that any crush forces are directed and/or transferred towards the same. Additionally, if a conductive armor component is used, strength members 14 are preferably also formed from a conductive material such as steel, rather than a more expensive glass-reinforced plastic strength member. Moreover, it is also possible to join or attach strength member 14 with the armor layer by gluing, crimping, welding, or the like. FIG. 8a depicts a cable 80' having a pair of generally flat armor components 85 disposed within the cable jacket. The cable jacket of this embodiment is formed from more than one layer, specifically an inner jacket 18' and an outer jacket 18". Consequently, the properties may be tailored for performance such as coupling, tear resistance, or the other properties. By way of example, inner jacket 18' may be a linear low-density polyethylene (LLDPE) for tear resistance and outer jacket 18" may be a medium or high density polyethylene for durability and abrasion resistance; however, other suitable materials may be used. In this embodiment, the cavity does not include a tube therein and the minor cavity dimension is smaller than the strength member dimension. Additionally, cable 80' includes a plurality of optional ripcords 89 disposed between armor components 85' and strength members 14.

Figures 9, 10:
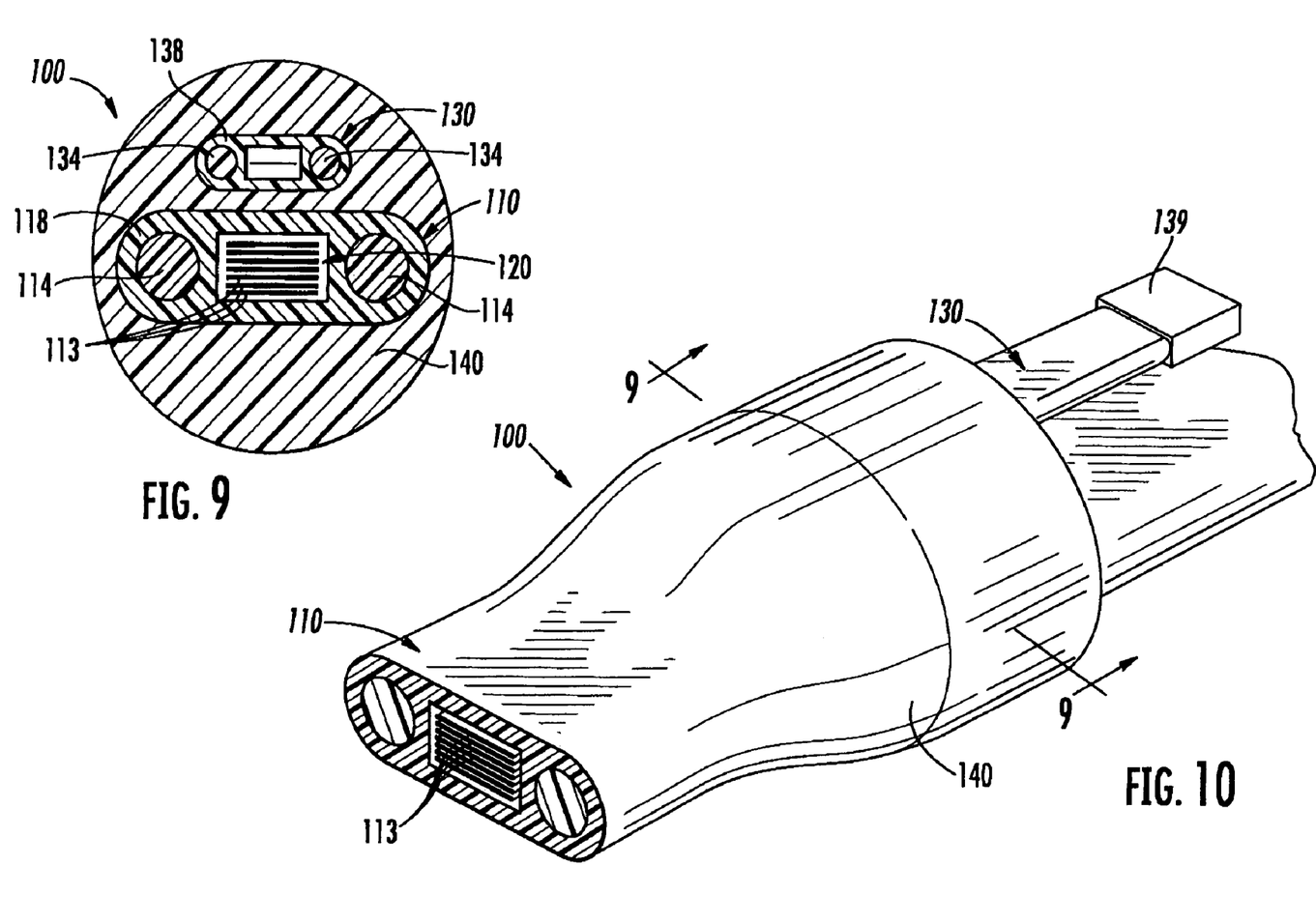
FIGS. 9 and 10 respectively are a cross-sectional view and a perspective view of an explanatory fiber optic cable assembly according to the present invention.

Cables of the present invention are also useful as a portion of a larger cable assembly that is useful for distributing optical fibers toward the subscriber. The cable assemblies can be assembled in the factory or they can be constructed in the field. FIGS. 9 and 10 respectively depict perspective and cross-sectional views of an exemplary cable assembly 100 that is suitable for distributing optical fiber(s) towards the subscriber in a communication network. Cable assembly 100 includes a distribution cable 110, which may be similar to cable 10, and a tether cable 120 that can be used for connecting to a node of the optical network. In preferred embodiments, a plurality of tether cables 120 have at least one optical fiber in optical communication with optical fibers of distribution cable 110 so that the cable assembly can connect to a plurality of nodes. Cable assemblies of the present invention can use any suitable distribution and/or tether cables as dictated by the given application. As shown, distribution cable 110 includes at least one optical fiber that is a portion of optical fiber ribbon 113, at least one strength member 114, and a cable jacket 118. Cable jacket 118 forms a cavity 120 therein for housing optical fiber 112. Like cable 10, cavity 120 has a cavity minor dimension CH and a cavity major dimension CW. Again, cavity minor dimension CH is generally aligned with a minor dimension H1 of distribution cable 110 and cavity major dimension CW is generally aligned with the major dimension W1 of distribution cable 110. As depicted, distribution cable 110 strength members 114 are disposed on opposite sides of cavity 120 and are sized so that a strength member dimension D is about the same size or smaller than the cavity minor dimension CH, but other suitable geometries are possible. Consequently, the craftsman in the factory or the field has simple and easy access to cavity 120, thereby allowing entry to cavity 120 while inhibiting damage to the at least one optical fiber 112 and/or strength members 114 during the access procedure.

Figures 10A, 12:
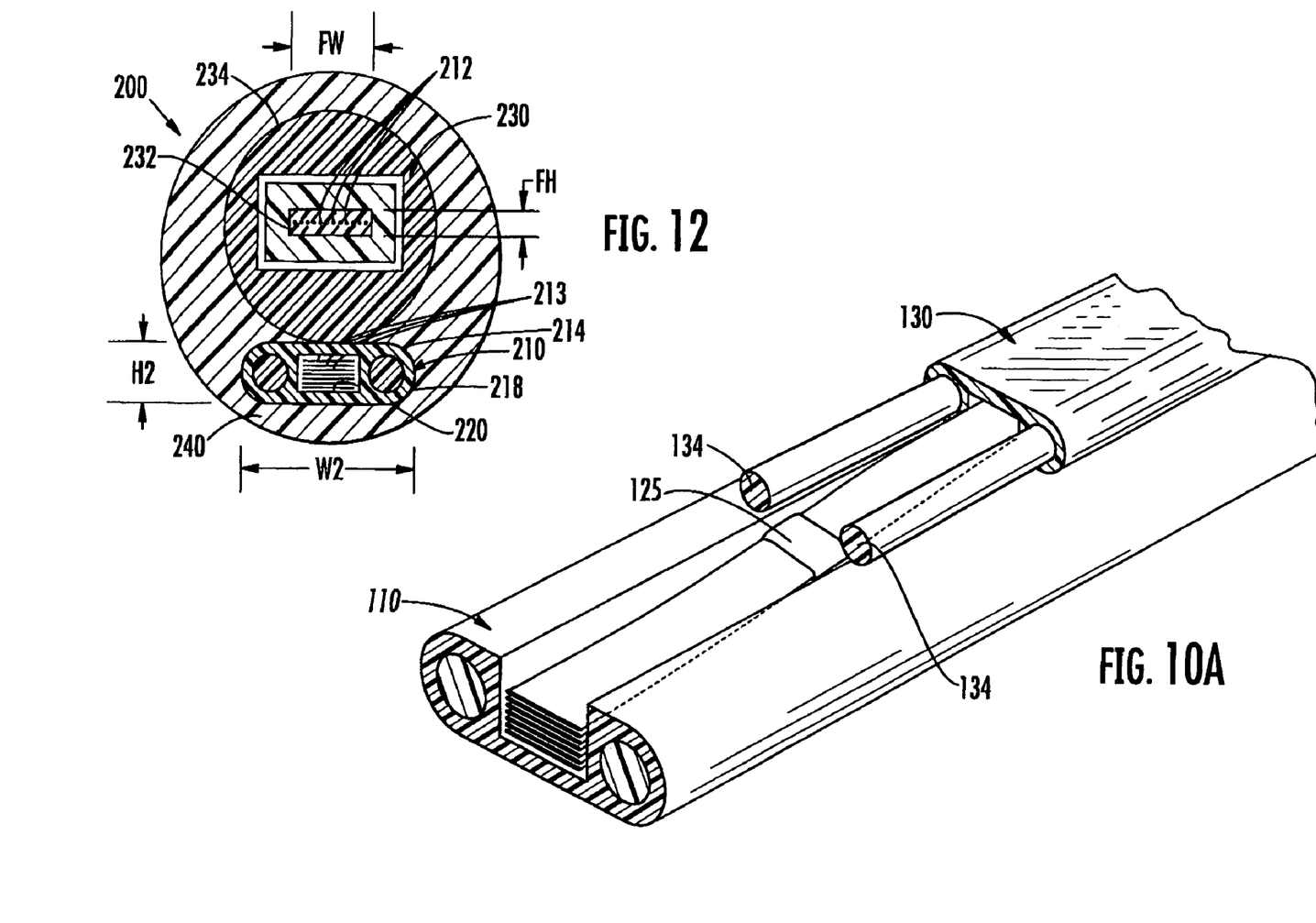
FIG. 10a depicts a perspective view of a portion the cable FIGS. 9 and 10 after being opened and before the overmold portion is applied.
FIGS. 12 and 12a respectively are a cross-sectional view and a perspective view of another fiber optic cable assembly according to the present invention.

FIG. 10a is a perspective view showing distribution cable 110 after it is opened with tether cable 130 prepared and in position before being wrapped by a tape (not shown) and encapsulated by an overmolded portion 140. As shown, the appropriate optical fibers of tether cable 130 are optically connected with the appropriate optical fibers of distribution cable 110 and the routing of fibers and the optical connection are protected from undue stresses using suitable structures and/or components during bending. Preparing tether cable 130 for assembly 100 requires removing a portion of the jacket 138 of tether cable 130 and exposing the strength members 134 and as shown. A portion of strength members 134 are exposed so that they can be connected and/or secured by the overmold portion 140, thereby providing strain relief for tether cable 130. Thereafter, the optical fibers (not numbered) of tether cable 130 may be enclosed in a respective furcation tubing (not numbered) for protecting and routing the fibers towards a splice point 125. The optical fibers are fusion spliced together and splice point 125 may be optionally held in a splice holder, fucation tube, or the like and generally disposed within an opened portion of the cavity 120 of the distribution cable. Positioning splice point 125 within cavity 120 is advantageous because it is disposed relatively close to a neutral bending axis of cable assembly 100, thereby inhibiting stresses on splice point 125 during bending of cable assembly 100. Additionally, the splice holder and a portion of the furcation tubes may optionally be enclosed within a small tube for further protection and/or allowing small movement among the components. Then, about the point where the optical connection between the cables is performed an environmental seal is provided to seal out the elements and inhibit bending beyond a minimum bend radius. By way of example, the area about the connection point of the cables includes overmolded portion 140 formed from a suitable material, but other suitable sealing configurations are possible. Before applying overmolded portion 140, a protective tape or wrap is applied over the splice area for keeping the overmold material away from sensitive areas. The cross-sectional footprint of overmolded portion 140 should be relatively small and straightforward to construct while providing the necessary protection. Additionally, tether cable 110 may further include a ferrule 139 and/or a connector (not shown) on its free-end for quick and easy connection to the optical network. In assemblies intended for outdoor applications the connector is preferably environmentally sealed and hardened, thereby making it robust and reliable. An example of a suitable connector is available from Corning Cable Systems sold under the tradename OptiTap; however, other suitable connectors may be used.

Figure 11A:
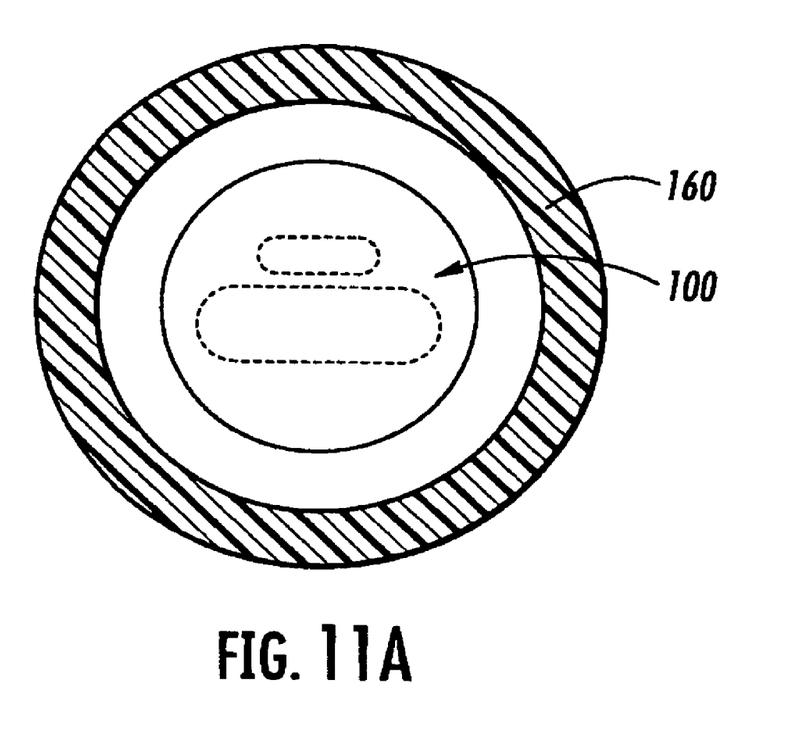
FIG. 11 is a cross-sectional view of the fiber optic cable assembly of FIGS. 9 and 10 disposed within a duct along with a round cable assembly shown by the phantom lines.
Figure 11B:
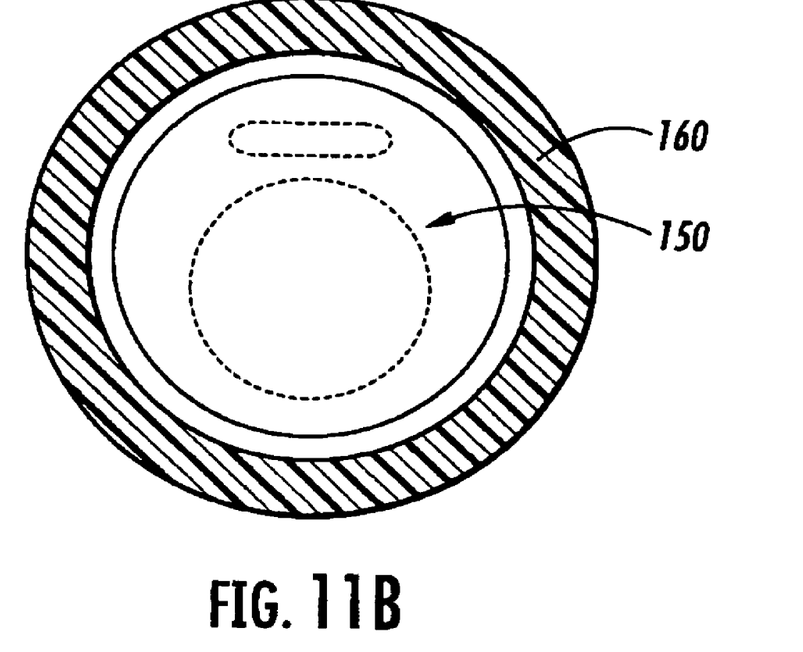

Tether cable 120 can have any suitable cable construction such as round or generally flat as shown in FIG. 9; however, a generally flat design may have advantages. Because cable assembly 100 uses two generally flat cables it imparts a relatively small cable assembly cross-sectional footprint with adequate flexibility, thereby making the assembly advantageous in certain applications such as pulling into ducts where small footprints and flexibility are required. For instance, small suitable cross-section footprints such as in FIG. 9 makes pulling the cable assembly into ducts such as 1¼ inch inner diameter ducts relatively easy. Respectively, FIGS. 11 and 11a schematically depict a cross-section of cable assembly 100 disposed in a 1¼ inch inner diameter duct and a cross-section of a cable assembly 150 using a round distribution cable for comparative purposes. As shown, cable assembly 100 has a relatively small duct fill ratio that allows for easily pulling of the assembly. Besides the fill ratio, the maximum assembly cross-sectional dimension is also important when pulling into duct. As shown by FIG. 11, cable assembly 100 has a relatively small maximum assembly cross-sectional dimension because the major dimensions of the cables are generally parallel and the minor dimensions are generally stacked together. Consequently, cable assembly 100 is suitable for aerial, buried, or duct applications. On the other hand, cable assembly 150 uses a round distribution cable and has a relatively large fill ratio and maximum assembly cross-sectional dimension, thereby making pulling around bends and corners in duct difficult if not impossible if the assembly fits within the duct.

Cable assembly 100 has a maximum cross-sectional area near the point where tether cable 130 is connected due to the connectorization and/or environmentally sealing, i.e. the overmolding, near the point where the distribution cable is opened. For instance, at the overmolded portion 140, cable assembly 100 preferably has a maximum assembly cross-sectional dimension of about 25 millimeters or less, more preferably, about 21 millimeters or less, and most preferably about 17 millimeters or less. Additionally, cable assemblies of present invention have a fill-ratio about 80 percent or less and more preferably about 70 percent or less for the given inner diameter of the duct.

FIGS. 12 and 12a respectively illustrates a cross-sectional view and a perspective view of a cable assembly 200 that includes a distribution cable 210, a receptacle or other suitable joining point 230, and an overmold portion 240. Cable assembly 200 is advantageous because it has a relatively small cross-sectional footprint due to the arrangement between distribution cable 210 and receptacle 230. Distribution cable 210 includes a plurality of ribbons 213 disposed within a cavity 220 of a cable jacket 218. Distribution cable 210 also includes two strength members 214 disposed on opposite sides of cavity 220. Distribution cable 210 has a flat profile with two generally flat major surfaces (not numbered) with major dimension W2 and minor dimension H2 of the cable; however, this cable may have any suitably sized and/or shaped cavity. Simply stated, cavity 220 may have any suitable minor or major dimension. In this embodiment, cable assembly 200 routes the optical fibers from one or more of the plurality of ribbons 213 of distribution cable 210 to receptacle 230 without using a tether cable. As shown, this embodiment includes twelve-fiber ribbons and uses twelve-fiber ferrules; however, any suitable combination of optical fiber arrangements and ferrule constructions are possible. Receptacle 230 is suitable for terminating a plurality of optical fibers 212 within a multifiber ferrule 232 that is attached to housing 234 of the receptacle. Receptacle 230 is preferably hardened and configured for an environmental sealing of the assembly. Housing 234 aids in aligning and protecting ferrule 232 and is preferably keyed. Additionally, receptacle 230 may have a threaded portion for securing the optical connection with a complimentary mating assembly such as a hardened connector. Additionally, receptacle 230 can have a cap 250 that is removably attached thereto for protecting the ferrule, connector, and/or receptacle during overmolding and afterwards. Suitable receptacles are shown and described in U.S. Pat. No. 6,579,014 issued Jun. 17, 2003 entitled "Fiber Optic Receptacle" and U.S. patent application Ser. No. 10/924,525 filed Aug. 24, 2004 entitled "Fiber Optic Receptacle and Plug Assemblies," the disclosures of which are incorporated by reference herein. Other cable assemblies may have connectors or receptacles that eliminate the shroud or housing, thereby allowing a smaller cross-sectional footprint. Specifically, optical fibers 212 are routed to a multifiber ferrule 232 of connector 230 where they are attached in respective bores. Ferrule 232 has a cross-section with a minor axis FH and a major axis FW. Ferrule 232 may have any suitable orientation with respect to cable 210, but in preferred embodiments minor axis FH is generally aligned with minor dimension H2 of cable 210, thereby providing a known orientation that may be useful for maintaining a small cross-sectional footprint for the assembly. Of course, cable assembly 200 can have multiple connectors 230 attached along its length; moreover, cable assembly 200 may locate connectors on either or both sides of the generally flat major surfaces.

It will be apparent to those skilled in the art that various modifications and variations can be made in the cable and cable assemblies of the present invention without departing from the spirit or scope of the invention. For instance, cables or assemblies of the present invention can include other cable components such as ripcords, paper or mica tapes, a friction element, or other suitable components. Illustratively, a cable similar to cable 10 can further include a plurality of small steel wires disposed near the north and south positions for inhibiting cutting into the grps during access procedures. Although cable assemblies discuss a distribution cable that is in optical communication with one or more tether cables, the cable assemblies may be used upstream in the optical network such as a feeder cable that is in optical communication with one or more distribution cables. Thus, it is intended that the present invention cover the modifications and variations of this invention provided they come within the scope of the appended claims and their equivalents.

That which is claimed is:

1. A fiber optic cable comprising:
  at least one optical fiber;
  a first strength member and a second strength member, wherein the first strength member has a strength member dimension (D);
  a cable jacket, the cable jacket having two major surfaces and a cavity, the cavity having a cavity minor dimension generally orientated with a minor dimension of the fiber optic cable, the at least one optical fiber being disposed within the cavity and the first strength member and second strength member are disposed on opposite sides of the cavity, wherein the cavity minor dimension is larger than the strength member dimension (D), thereby allowing access to the cavity while inhibiting damage to the at least one optical fiber; and
  at least one foam tape disposed within the cavity.

2. The fiber optic cable of claim 1, the cavity minor dimension being greater than the strength member dimension (D) by about five percent or more.

3. The fiber optic cable of claim 1, the cavity being generally rectangular.

4. The fiber optic cable of claim 1, the at least one optical fiber being a portion of a fiber optic ribbon.

5. The fiber optic cable of claim 1, further comprising a water-swellable component or a water-blocking component.

6. The fiber optic cable of claim 1, the minor dimension of the fiber optic cable being about 10 millimeters or less and a major dimension of the fiber optic cable being about 15 millimeters or less.

7. The fiber optic cable of claim 1, the at least one optical fiber being portion of a fiber optic ribbon having a ribbon planar surface and the at least one foam tape having a planar surface, wherein the ribbon planar surface generally faces the planar surface of the at least one foam tape.

8. The fiber optic cable of claim 1, the at least one optical fiber being a portion of a fiber optic ribbon and a first foam tape is disposed on a first side of the fiber optic ribbon and a second foam tape is disposed on a second side of the fiber optic ribbon.

9. The fiber optic cable of claim 1, the at least one foam tape having a water-swellable layer attached thereto.

10. The fiber optic cable of claim 1, the at least one optical fiber being a portion of a fiber optic ribbon, wherein the fiber optic ribbon has an excess ribbon length.

11. The fiber optic cable of claim 1, the at least one optical fiber being a portion of a fiber optic ribbon that has an excess ribbon length and further comprises a first foam tape disposed on a first side of the fiber optic ribbon, a second foam tape disposed on a second side of the fiber optic ribbon.

12. The fiber optic cable of claim 1, the at least one foam tape is an open cell polyurethane material.

13. The fiber optic cable of claim 1, the cavity having a major dimension, wherein the at least one foam tape is generally aligned with the major dimension of the cavity.

14. The fiber optic cable of claim 1, the cavity having a major dimension that forms a major dimension cavity surface, wherein the at least one foam tape contacts the major dimension cavity surface.

15. The fiber optic cable of claim 1, the at least one optical fiber being a portion of a fiber optic ribbon and further comprising a first foam tape disposed on a first side of the fiber optic ribbon and a second foam tape disposed on a second side of the fiber optic ribbon, wherein the first and second foam tape are generally aligned with a major dimension of the cavity.

16. A fiber optic cable comprising:
  at least one optical fiber ribbon;
  a first strength member;
  a second strength member;

a cable jacket, the cable jacket having a cavity with the first strength member and the second strength member being disposed on opposite sides of the cavity, the cavity having a cavity minor dimension generally orientated with a minor dimension of the fiber optic cable, wherein the at least one optical fiber ribbon is disposed within the cavity; and at least one foam tape disposed within the cavity for coupling the at least one optical fiber ribbon within the cavity.

17. The fiber optic cable of claim 16, the cavity minor dimension being greater than a first strength member dimension (D) by about five percent or more.

18. The fiber optic cable of claim 16, the cavity being generally rectangular.

19. The fiber optic cable of claim 16, the at least one optical fiber ribbon being splitable into subunits.

20. The fiber optic cable of claim 16, further comprising an armor component.

21. The fiber optic cable of claim 16, further comprising a water-swellable component or a water-blocking component.

22. The fiber optic cable of claim 16, the cable jacket being flame retardant.

23. The fiber optic cable of claim 16, the at least one optical fiber ribbon having a ribbon planar surface and the at least one foam tape having a planar surface, wherein the ribbon planar surface generally faces the planer surface of the at least one foam tape.

24. The fiber optic cable of claim 16, the at least one optical fiber ribbon being disposed on a first side of the fiber optic ribbon and a second foam tape is disposed on a second side of the fiber optic ribbon.

25. The fiber optic cable of claim 16, the at least one foam tape having a water-swellable layer attached thereto.

26. The fiber optic cable of claim 16, the at least one optical fiber ribbon has an excess ribbon length and is sandwiched between the at least one foam tape and a second foam tape.

27. The fiber optic cable of claim 16, the at least one foam tape is an open cell polyurethane material.

28. The fiber optic cable of claim 16, the cavity having a major dimension, wherein the at least one foam tape is generally aligned with the major dimension of the cavity.

29. The fiber optic cable of claim 16, the cavity having a major dimension that forms a major dimension cavity surface, wherein the at least one foam tape contacts the major dimension cavity surface.

30. The fiber optic cable of claim 16, the at least one optical fiber ribbon being sandwiched between the at least one foam tape and a second foam tape, wherein the foam tapes are generally aligned with a major dimension of the cavity.

* * * * *